(12) United States Patent
Gold et al.

(10) Patent No.: US 7,913,103 B2
(45) Date of Patent: Mar. 22, 2011

(54) METHOD AND APPARATUS FOR CLOCK CYCLE STEALING

(75) Inventors: Spencer M. Gold, Pepperell, MA (US); Bill K. C. Kwan, Austin, TX (US); Craig D. Eaton, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 824 days.

(21) Appl. No.: 11/841,179

(22) Filed: Aug. 31, 2007

(65) Prior Publication Data
US 2009/0063888 A1 Mar. 5, 2009

(51) Int. Cl.
*G06K 1/00* (2006.01)
*H03K 3/017* (2006.01)
(52) U.S. Cl. .................. 713/501; 713/322; 327/175
(58) Field of Classification Search .................. 713/501
See application file for complete search history.

(56) References Cited

U.S. PATENT DOCUMENTS

| | | | | |
|---|---|---|---|---|
| 4,089,059 A | * | 5/1978 | Miller et al. ................. | 708/130 |
| 4,807,156 A | * | 2/1989 | Parisi ........................... | 358/1.2 |
| 5,790,614 A | * | 8/1998 | Powell ........................ | 375/376 |
| 6,195,757 B1 | | 2/2001 | McNamara | |
| 6,486,705 B2 | * | 11/2002 | Andrews et al. ............. | 326/93 |
| 6,529,057 B2 | * | 3/2003 | Yee ............................. | 327/172 |
| 6,668,357 B2 | | 12/2003 | Masleid | |
| 7,151,399 B2 | * | 12/2006 | Kaizuka ...................... | 327/295 |
| 7,212,050 B2 | * | 5/2007 | Meltzer ....................... | 327/156 |
| 7,296,246 B1 | | 11/2007 | Kuehlmann | |
| 7,500,123 B2 | * | 3/2009 | Luong et al. ................ | 713/322 |
| 2003/0229815 A1 | * | 12/2003 | Fujiwara et al. ............ | 713/500 |

* cited by examiner

*Primary Examiner* — Suresh K Suryawanshi
(74) *Attorney, Agent, or Firm* — Meyertons, Hood, Kivlin, Kowert & Goetzel, P.C.; Erik A. Heter (57) ABSTRACT

A method for producing a plurality of clock signals. The method includes generating a reference clock signal using a phase locked loop (PLL). The reference clock signal is then provided to each of a plurality of clock divider units which each divide the received reference clock signal to produce a corresponding divided clock signal. The method then removes one or more clock cycles (per a given number of cycles) in order to produce a plurality of domain clock signals each having an effective frequency based on a frequency and a number of cycles removed from the correspondingly received divided clock signal.

18 Claims, 6 Drawing Sheets

METHOD AND APPARATUS FOR CLOCK CYCLE STEALING

BACKGROUND OF THE INVENTION

1. Field of the Invention

This invention relates to integrated circuits, and more particularly, to clock circuits for producing clock signals.

2. Description of the Related Art

Complex integrated circuits, such as microprocessors, often times have the need to operate different portions using different, independent clock signals. Each of these different portions is referred to as a clock domain. For example, a microprocessor may have a first processor core, a second processor core, and a bus interface unit that each operate using separate and independent clocks. These clocks may operate at different frequencies, and often times, at frequencies that may be varied according to specific needs. For example, the clock signal of a first processor core that is performing a processor-intensive task may operate at a higher frequency than the clock signal of a second processor core that is performing a less intensive task. The frequencies of these clock signals may be raised and lowered as necessary depending on the tasks to be performed as well as other considerations, such as power consumption and/or thermal output.

The simplest way to implement multiple clock signals is to provide multiple oscillators. A more common solution that is used with integrated circuits is to provide a single oscillator or other type of clock generation circuit to generate a reference clock, which is then provided to multiple phase-locked loops (PLLs). Each different PLL can provide a clock output signal independent of the others. Furthermore, PLLs can be configured to make the frequency of their respective output clock adjustable. While PLLs are analog circuits, they can be implemented on an integrated circuit die that otherwise is comprised primarily of digital circuits.

SUMMARY OF THE INVENTION

A method for producing a plurality of clock signals is disclosed. In one embodiment, the method includes generating a reference clock signal using a phase locked loop (PLL). The reference clock signal is then provided to each of a plurality of clock divider units which each divide the received reference clock signal to produce a corresponding divided clock signal. The method then removes one or more clock cycles (per a given number of cycles) in order to produce a plurality of domain clock signals each having an effective frequency based on a frequency and a number of cycles removed from the correspondingly received divided clock signal.

An apparatus for producing a plurality of clock signals is also disclosed. In one embodiment, the apparatus includes a PLL configured to generate a reference clock signal. The apparatus includes a phase-locked loop configured to generate a reference clock signal. A plurality of clock divider units are each coupled to receive the reference clock signal from the PLL and are configured to generate a corresponding divided clock signal from the reference clock signal. The apparatus further includes a plurality of cycle stealing units. Each of the cycle stealing units is coupled to receive a corresponding divided clock signal. Each cycle stealing unit is configured to remove one or more clock cycles per a given number of clock cycles from the correspondingly received divided clock signal to generate a domain clock signal having an effective frequency based on the frequency of the corresponding divided clock signal and the number of cycles removed.

In various embodiments, the apparatus may also include a plurality of clock synthesizers, each coupled to a corresponding cycle stealing unit. Each clock synthesizer is configured to synthesize a clock signal based on clock cycles removed by the corresponding cycle stealing unit. Each clock synthesizer may synthesize its respective domain clock signal based on cycles removed from each of a number of different phases of the corresponding divided clock signal. In such embodiments, the PLL used may output the reference clock signal in a plurality of phases (e.g., 0°, 90°, 180°, and 270°).

Also disclosed herein is an integrated circuit having a plurality of clock domains, wherein each clock domain is configured to receive a different clock signal. These clock signals may have different frequencies from each other, depending on a performance state and a specific configuration. The clock signals received by each of the clock domains may be produced by removing one or more cycles of a clock signal for each of a number of clock cycles.

The method and apparatus disclosed herein may allow the generation of a plurality of different clock cycles for different clock domains using a single phase locked loop.

BRIEF DESCRIPTION OF THE DRAWINGS

Other aspects of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but, on the contrary, the invention is to cover all modifications, equivalents, and alternatives falling with the spirit and scope of the present invention as defined by the appended claims.

DETAILED DESCRIPTION OF THE INVENTION

Figure 1:
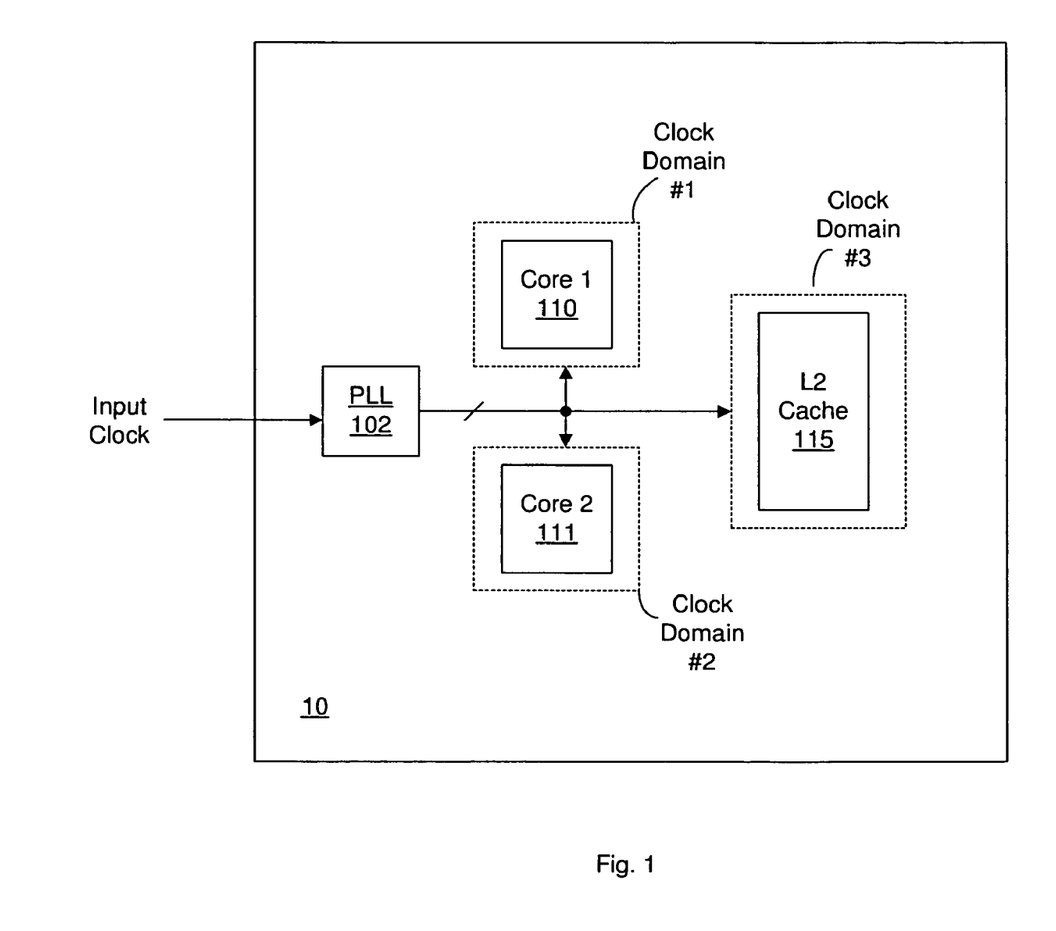
FIG. 1 is a block diagram illustrating one embodiment of a processor having multiple clock domains and a single phase locked loop (PLL)

Turning now to FIG. 1, a block diagram illustrating one embodiment of a processor having multiple clock domains and a single phase locked loop (PLL) is shown. In the embodiment shown, processor 10 includes a first core 110, a second core 111, and an L2 cache 115. First core 110 is in clock domain #1, second core 111 is in clock domain #2, and L2 cache 115 is in clock domain #3. Additional units within other clock domains may be present. For example, a fourth clock domain may include a bus interface unit, while a North Bridge may be implemented in a fifth clock domain, and so forth.

Processor 10 also includes a PLL 102, which is configured to generate a reference clock signal which is provided to each of the clock domains based on a clock signal received from an off-chip oscillator or other clock generating means. Each of the clock domains includes additional functionality that may alter the frequency of their respective domain clock signals. The domain-specific output clock signals may be variable in frequency, and may also be different in frequency from each other at various times during operation of processor 10. For example, if processor 10 is experiencing a reduced workload, the frequency of one or both of the domain clock signals may be reduced, and their respective frequencies may be different from each other. Conversely, if the workload increases, the frequencies of one or both of the domain clock signals may be increased, and may be different from each other in this situation as well.

Figure 2:
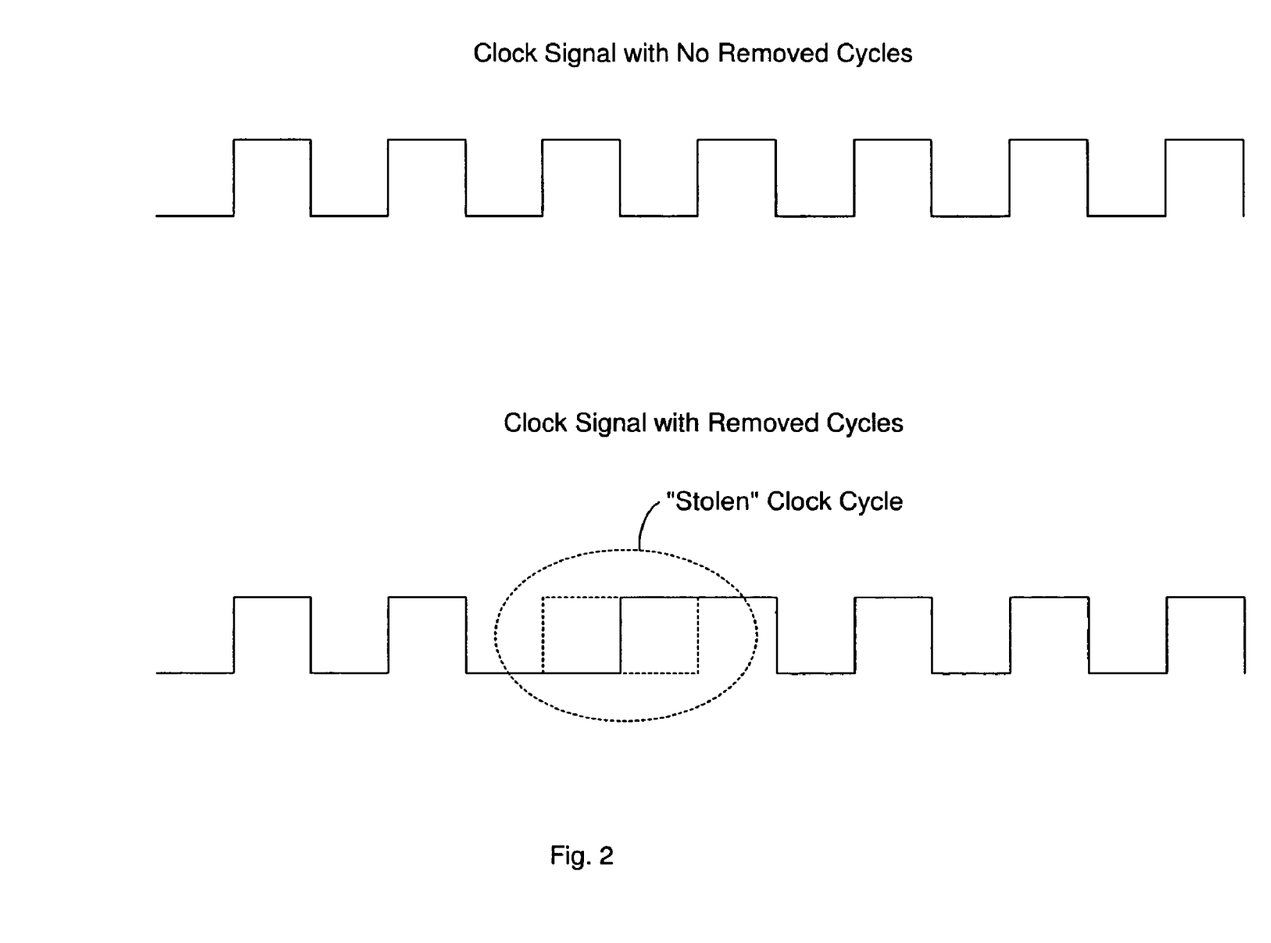
FIG. 2 is a timing diagram illustrating a clock signal with a stolen cycle.

In order to produce the domain clock signals, each clock domain may include at least a unit configured to utilize a technique known as 'cycle stealing'. FIG. 2 is a timing diagram illustrating a clock signal with a removed ('stolen') cycle relative to a clock signal with no removed cycles. In the clock signal with no removed cycles, a total of seven clock cycles are shown. One of these clock signals is shown as removed in the clock signal with removed cycles, with the removed cycle indicated by the dashed lines. Thus, the clock signal with a removed cycle has only six cycles in the same amount of time as the clock signal with no removed cycles. Accordingly, the effective frequency of the clock signal with a removed cycle is 6/7 of that of the clock signal with no removed cycles. In this particular example, the cycle is removed in such a manner as to maintain a 50% duty cycle.

In general, the effective frequency of a clock signal with stolen cycles may be set by removing a given number of cycles within a predetermined period. For example, a frequency that is 75% of the received clock signal can be achieved by removing 5 cycles within a period (or predetermined number) of 20 cycles. Thus, if the frequency of the clock signal without removed cycles is 2.0 GHz, the frequency of the clock signal with 5 of every 20 cycles removed is 1.5 GHz.

In removing clock cycles, it is important to determine which cycles are removed. For example, if 5 of 20 clock cycle are removed, it is important that the removed clock cycles be distributed in a somewhat even fashion among the entire 20 cycles. If the 5 clock cycles were all removed at the beginning or end of the 20 clock cycles, undesired effects such as oscillations on the power grid may occur. Thus, in this example, it is desirable to remove every fourth clock cycle, thereby distributing the removed clock cycles evenly. The particular cycles to be removed for each example may be determined based on the number of cycles to be removed, the total number of cycles, and the potential effects of removing the cycles.

Each clock domain may also include a divider that is used in conjunction with a cycle stealing unit. Thus, the received reference clock signal may by divided to produce a divided clock signal, followed by the removal of zero or more cycles from the divided clock signal to produce the domain clock signal. Table 1 below illustrates how the frequency of a domain clock signal can be varied using both a divider and a cycle stealing unit configured to remove n/22 cycles.

TABLE 1

| Clock Divider | Removed Cycles | Effective Frequency |
| --- | --- | --- |
| 1 | 0/22 | 2.2 GHz |
| 1 | 1/22 | 2.1 GHz |
| 1 | 2/22 | 2.0 GHz |
| 1 | 3/22 | 1.9 GHz |
| 1 | 4/22 | 1.8 GHz |
| 1 | 5/22 | 1.7 GHz |
| 1 | 6/22 | 1.6 GHz |
| 1 | 7/22 | 1.5 GHz |
| 1 | 8/22 | 1.4 GHz |
| 1 | 9/22 | 1.3 GHz |
| 1 | 10/22 | 1.2 GHz |
| 2 | 0/22 | 1.1 GHz |
| 2 | 2/22 | 1.0 GHz |
| 2 | 4/22 | 900 MHz |
| 2 | 6/22 | 800 MHz |
| 2 | 8/22 | 700 MHz |
| 2 | 10/22 | 600 MHz |
| 4 | 2/22 | 500 MHz |
| 4 | 6/22 | 400 MHz |
| 4 | 10/22 | 300 MHz |

In the example of Table 1, the clock divider can divide the clock signal by 1 (i.e. essentially an undivided clock signal) 2, or 4. When the received (i.e. the reference) clock signal is divided by 1, up to 10 of every 22 cycles is removed, thus varying the effective frequency anywhere between a maximum of 2.2 GHz (when 0/22 cycles are removed) to 1.2 GHz. Since a frequency of 1.1 GHz can easily be achieved by dividing the 2.2 GHz clock signal by 2, there is no need to instead remove 11/22 clock cycles. After dividing the received clock signal by 2, clock cycles can be removed in increments of 2 (e.g., 0, 2, 4, etc.) to vary the effective frequency anywhere between 1.1 GHz and 600 MHz in 100 MHz increments. After dividing by 4, clock cycles can be removed in increments of 4 in order to vary the effective frequency anywhere between 500 MHz and 300 MHz in increments of 100 MHz.

It should also be noted that embodiments are possible and contemplated wherein a clock signal may be divided by a non-integer value (e.g., divide by 1.5).

Figure 3:
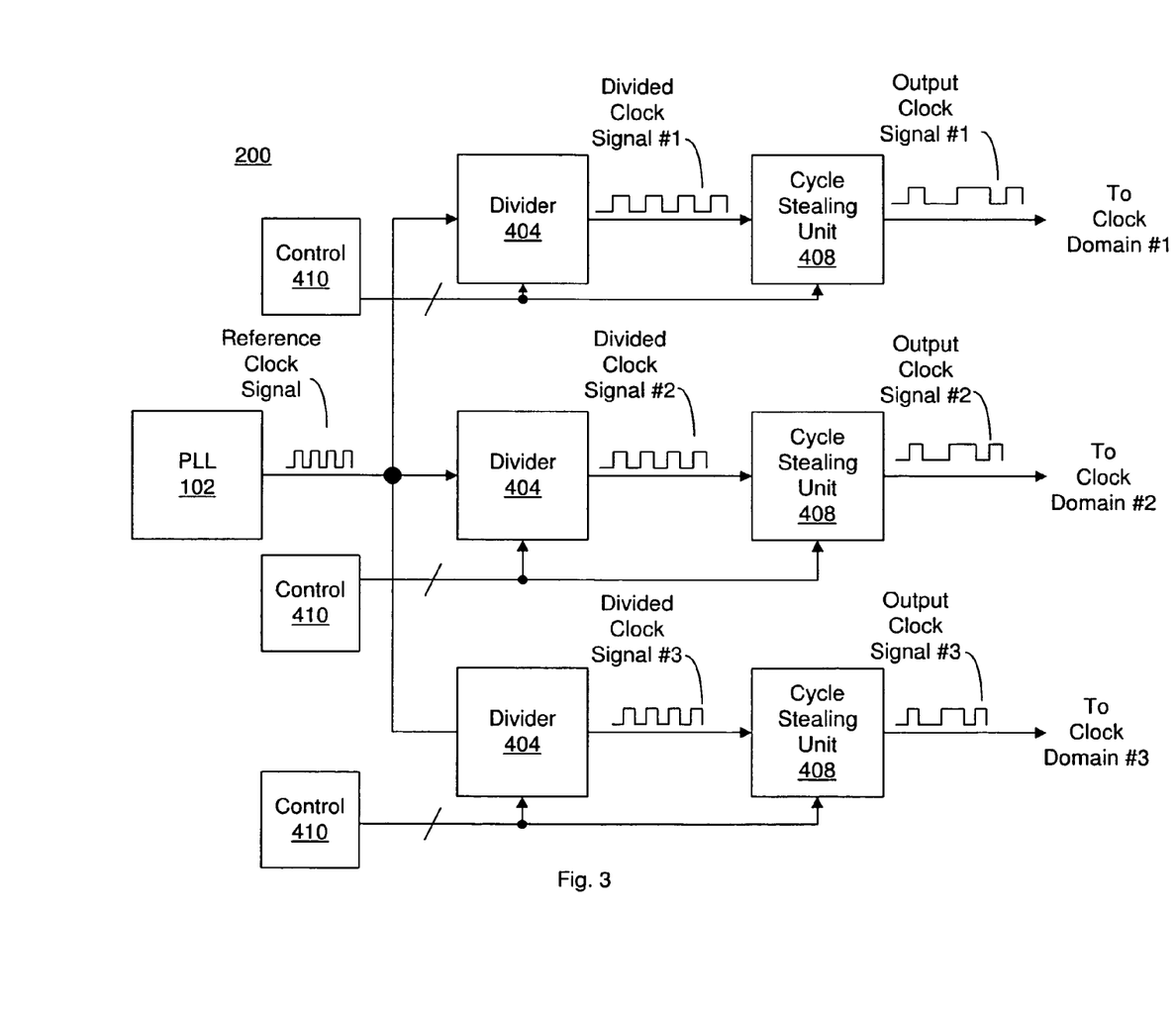
FIG. 3 is a block diagram of one embodiment of an apparatus configured to generate multiple clock signals using a single PLL and a plurality of cycle stealing units.

FIG. 3 is a block diagram of one embodiment of an apparatus configured to generate multiple clock signals using a single PLL and a plurality of cycle stealing units. In the embodiment shown, clock generation apparatus 200 includes a PLL 102 coupled to provide a reference clock signal to each of a plurality of dividers 404. Each of divider 404 is configured to produce a divided clock signal. It should be noted that, in accordance with the discussion above and for the purpose of this disclosure, that a divided clock signal includes one wherein the reference clock is divided by one. Embodiments with no clock divider are also possible and contemplated, particularly where the domain clock frequency is to be varied such that the lowest frequency is greater than half the frequency of the received reference clock signal. However, embodiments utilizing dividers offer a greater range of domain clock frequencies.

Each divider 404 has an output coupled to an input of a corresponding cycle stealing unit 408. Each cycle stealing unit 404 is configured to remove zero or more cycles from its correspondingly received divided clock signal for each of a predetermined number of cycles occurring in a given period. Generally speaking, each cycle stealing unit is configured to remove n/m cycles for its corresponding divided clock signal, wherein n is the number of clock cycles removed and m is the total number of clock cycles occurring in the given period (e.g., n=5 and m=20 in an example discussed above).

Figure 4:
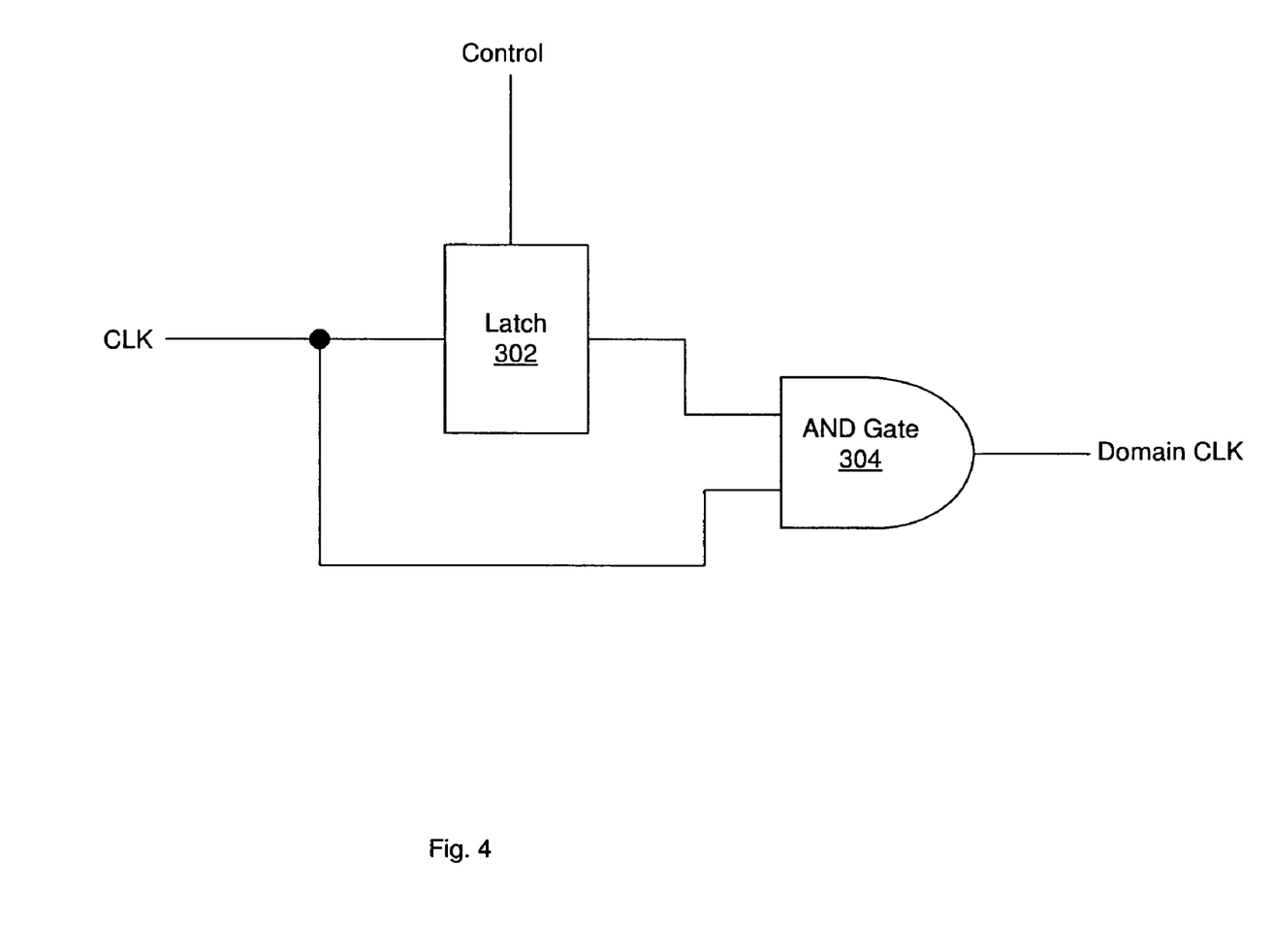
FIG. 4 is a logic diagram of one embodiment of a circuit used for cycle stealing.

A simple version of a cycle stealing unit is shown in FIG. 4. In the embodiment shown, cycle stealing unit 300 includes latch 302 and an AND gate 304. A clock signal (e.g., the divided clock signal) is provided to both latch 302 and the AND gate 304. Latch 302 is coupled to receive a control signal. When the control signal is in a first state, latch 302 allows the clock signal to pass through, while in a second state, the clock signal is inhibited from passing through. When the control signal is in the first state, the clock signal passes through cycle stealing unit 300 with no cycles stolen.

In order to steal a cycle, the control signal is placed in the second state, which inhibits the passage of the clock signal through latch 302. The control signal may be held in the second state for a duration at least sufficient to ensure the positive portion of the clock signal does not pass through, and thus the output of AND gate 304 remains low.

More complex versions of a cycle stealing unit may also be implemented. Such embodiments may allow a clock signal to essentially be stretched, thereby maintaining a 50% duty cycle for the domain clock signal that it output from the cycle stealing unit.

Returning to FIG. 3, clock generation apparatus 200 includes a plurality of control units 410, each of which is associated with a divider 404 and its corresponding cycle stealing unit 408. Each control unit 410 is configured to generate control signals that are provided to its corresponding divider 404 in order to set the divide ratio. Additionally, each control unit is also configured to generate control signals that are provided to its corresponding cycle stealing unit in order determine which clock cycles are to be removed from the divided clock signal. Thus, using the combination of the dividers and the cycle stealing units, the frequency for each domain clock signal can be varied over a wide range. Furthermore, clock generation apparatus 200 allows for the generation of multiple clock signals on a chip using only a single PLL in lieu of providing a separate PLL for each clock domain.

Figure 5:
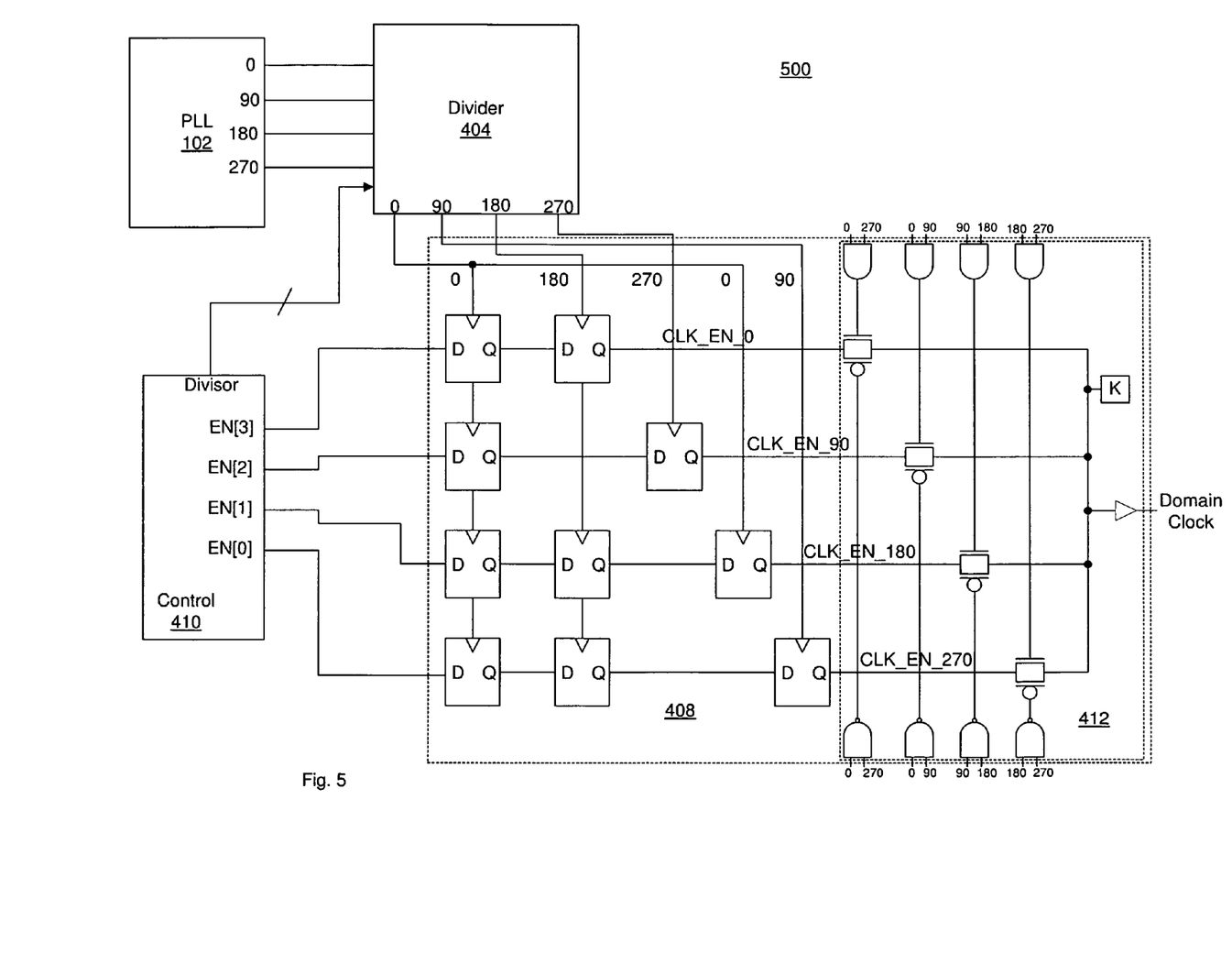
FIG. 5 is diagram of another embodiment of an apparatus configured to generate multiple clock signals using a single PLL and a plurality of cycle stealing units.

FIG. 5 is diagram of another embodiment of an apparatus configured to generate multiple clock signals using a single PLL and a plurality of cycle stealing units. The cycle stealing unit in this particular embodiment includes a clock synthesizer, wherein a domain clock signal is synthesized by dividing the reference clock signals and removing zero or clock cycles. For the sake of simplicity, only a single instance of a divider, a control unit, and a cycle stealing unit including a clock synthesizer are shown here. However, it should be understood that multiple instances of these units may be present, similar to the apparatus shown in FIG. 3.

In the embodiment shown, clock generation apparatus 500 includes a PLL 102 configured to provide a reference clock signal in multiple phase offsets. In this particular embodiment, PLL 102 provides the reference clock signal in phase offsets of 0°, 90°, 180°, and 270°. In other words, the embodiment of PLL 102 provided in this example essentially provides four different reference clock signals, each having the same frequency with offsets in increments of 90°. Each of the multiple phase offsets of the reference clock signal are provided to divider 404, which is configured to divide the multiple phase offsets by a divisor set by control unit 410. Divider 404 in this embodiment thus provides as an output a divided reference clock signal (hereafter 'divided clock signal') in the four different phase offsets of 0°, 90°, 180°, and 270°.

In addition to receiving the phase offsets of the divided clock signal, cycle stealing unit 408 is coupled to receive enable signals (in this case, CLK_EN[3:0]) from control unit 410. These enable signals are gated through their respective D flip-flops, which are each clocked by one of the phase offsets divided clock signal. Control unit 410 is configured to provide the enable signals in repeating patterns to cycle stealing unit 408. The particular patterns generated by control unit 410 are based on the divisor, the number of cycles to be stolen, and the percentage of the frequency of the domain clock signal relative to the maximum frequency, which is the frequency of the reference clock signal output by PLL 102. For example a domain clock signal having a frequency that is 58% of the frequency of the reference clock signal can be produced by clock generation apparatus by dividing the reference clock signal by 1.5, removing one of every eight clock cycles (for each of the phase offsets) and providing the enable signals in a repeating pattern.

The flip-flops in the embodiment shown are each clocked by one of the phase offsets of the divided clock signal received from divider 404.

The enable signals, when gated through the flip-flops in their respective signal paths, produce a corresponding clock enable signal. As shown in this example, a first group of 4 flip-flops each coupled to receive a corresponding one of enable signals [3:0] from control unit 410 are clocked by the divided clock signal with a 0° phase offset. Three of the signal paths (for CLK_EN[3], CLK_EN[1], and CLK_EN[0]) include flip-flops that are clocked by the divided clock signal with a 180° phase offset. The signal path for CLK_EN[2] includes a flip-flip flop that is clocked by the divided clock signal with a 270° phase offset, while the signal path for CLK_EN[0] includes a flip-flop clocked by the divided clock signal with a 90° phase offset. The signal path for CLK_EN [1] also includes a second flip-flop clocked by the divided clock signal with a 0° phase offset.

The clocking in of the enable signals on various phases of the divided clock signal results in four different signals that are provided to clock synthesizer, namely CLK_EN_0°, CLK_EN_90°, CLK_EN_180°, and CLK_EN_270°. These signals are then gated through the passgates shown based on phase overlaps of the divided clock signal. For example, CLK_EN_0° is gated through its respective passgate when the divided clock signal phase offsets of 0° and 270° are both in the logic high portion of their respective cycles. Similarly, CLK_EN_90° is gated through its respective passgate when the divided clock signal phase offsets of 0° and 90° are both in the logic high portion of their cycles. As shown in FIG. 5, the passgates are activated by a logic gate pair comprising an AND gate and a NAND gate, each coupled to receive the same divided clock signal phase offsets as input signals (other logic configurations are possible and contemplated). The CLK_EN_0°, CLK_EN_90°, CLK_EN_180°, and CLK_EN_270° signals are gated through to the wired OR structure of clock synthesizer, which includes a keeper 'K' to hold the logic values of the signals. This results in the synthesized domain clock output signal, which is output from clock synthesizer 412.

Thus, using a combination of the enable signals and the phase offsets of the divided clock signals, clock enable signals (i.e. CLK_EN_[3:0]) are toggled and provided to clock synthesizer 412. Table 2, which illustrates several examples of enable signal patterns for various desired domain clock frequencies (as a function of the frequency of the reference clock signal, Fmax).

TABLE 2

| Divisor | Cycle stealing | Fmax % | Repeating EN[3:0] Pattern |
|---|---|---|---|
| 1 | 0/8 | 100% | [1100] [1100] [1100] [1100] [1100] [1100] [1100] [1100] |
| 1 | 1/8 | 88% | [1100] [1100] [1100] [1100] [1100] [1100] [1100] [0000] |
| 1.5 | 0/8 | 67% | [1110] [0011] [1000] [1110] [0011] [1000] [1110] [0011] [1000] [1110] [0011] [1000] [1110] [0011] [1000] [1110] [0011] [1000] [1110] [0011] [1000] [1110] [0011] [1000] |
| 1.5 | 1/8 | 58% | [1110] [0011] [1000] [1110] [0011] [1000] [1110] [0011] [1000] [1110] [0000] [0000] [1110] [0011] [1000] [1110] [0011] [1000] [1110] [0011] [1000] [1110] [0000] [0000] |
| 2 | 0/8 | 50% | [1111] [0000] [1111] [0000] [1111] [0000] [1111] [0000] |
| 2 | 1/4 | 38% | [1111] [0000] [1111] [0000] [1111] [0000] [0000] [0000] |
| 4 | 0/8 | 25% | [1111] [1111] [0000] [0000] [1111] [1111] [0000] [0000] |
| 8 | 0/8 | 13% | [1111] [1111] [1111] [1111] [0000] [0000] [0000] [0000] |
| 16 | 0/8 | 6% | [1111] [1111] [1111] [1111] [1111] [1111] [1111] [1111] [0000] [0000] [0000] [0000] [0000] [0000] [0000] [0000] |
| 128 | 0/8 | 0.8% | [1111] × 64 [0000] × 64 |
| 512 | 0/8 | 0.2% | [1111] × 256 [0000] × 256 |

Figure 6:
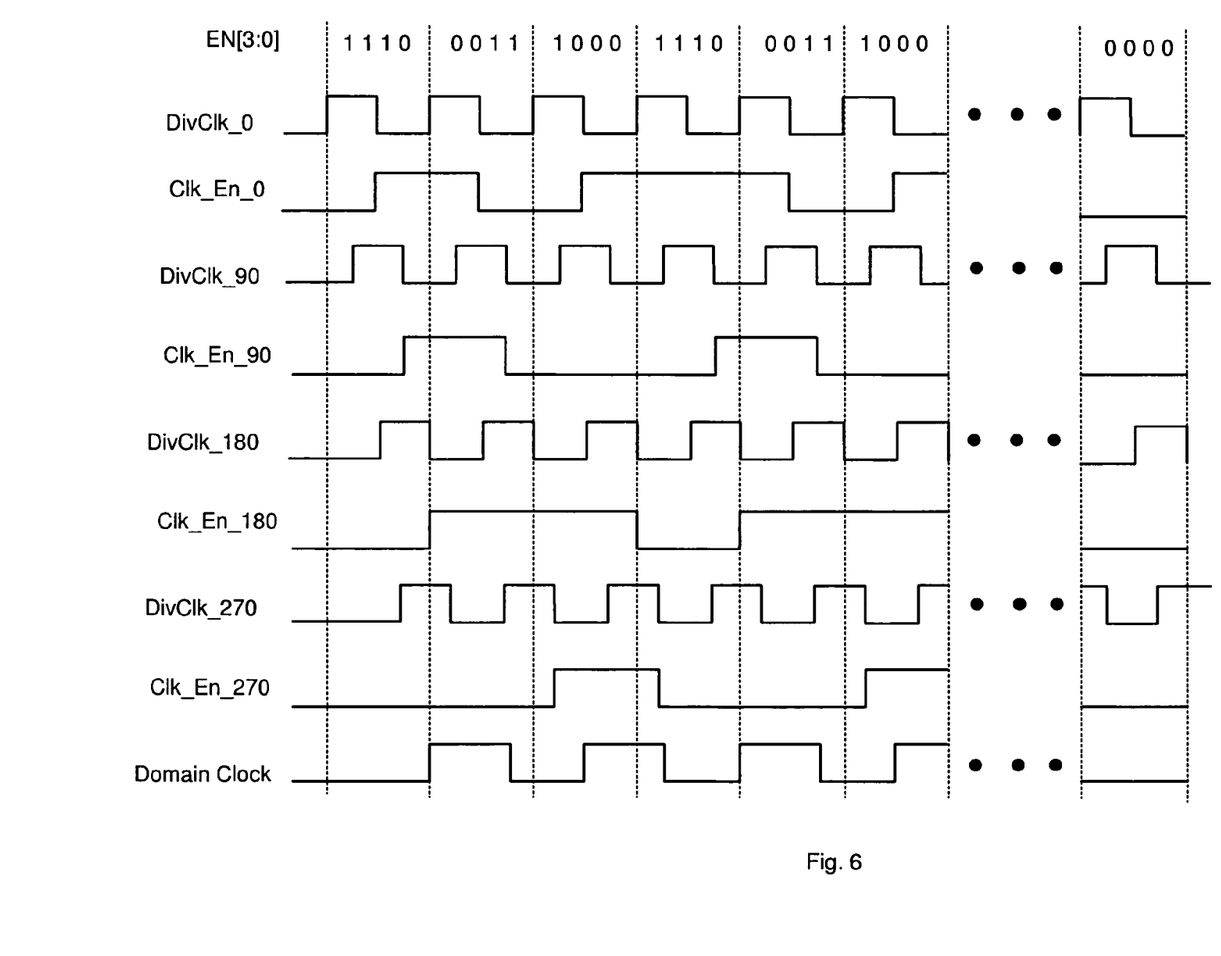
FIG. 6 is a timing diagram illustrating a clock signal synthesized using stolen clock cycles.

FIG. 6 is a timing diagram illustrating a domain clock signal synthesized using stolen clock cycles using an embodiment of the apparatus shown in FIG. 5. More particularly, the timing diagram of FIG. 6 illustrates the operation of the apparatus of the embodiment shown in FIG. 5 in synthesizing the domain clock signal.

After operation is initiated (with EN [3:0] being 1110), a next cycle (with EN [3:0] being 0011) produces the first high portion of the domain clock signal. A first part of the high portion occurs when both DivClk_0 and DivClk_270 are both high, while Clk_EN_0° is high (as a result of a logic high value of EN[3] being gated through during the previous cycle). When the 0° and 270° phases of the divided clock signal are both high, the corresponding passgate allows the passage of the high value to pass. Logic high values also pass when the 0° and 90° phases of the divided clock signal are both high (allowing the high value of Clk_EN_90° to pass) and when the 90° and 180° phases of the divided clock signal are both high (allowing the high value of Clk_EN_180° to pass). Since Clk_EN_270° is low when the 180° and 270° phases of the divided clock signal are both high, the low value propagates through the corresponding passgate and thus pulls the domain clock signal low.

A next high portion of the domain clock signal occurs when the 90° and 180° phases are both high (allowing the high on Clk_EN_180° to pass), followed by the 180° and 270° phases being high (allowing the high on CLk_EN_270°) to pass, followed by the 270° and 0° phases being high. Since Clk_EN_90°, Clk_EN_180°, and Clk_EN_270° are all low during the subsequent times when 90° and 180°, 180° and 270°, and 270° phases assert the output of their respective AND/NAND gates, another low portion of the domain clock signal is synthesized.

In the example shown, the domain clock signal is produced by dividing the reference clock signal by 1.5 and then stealing one of eight cycles. This results in a domain clock signal having an effective frequency that is 58% of the frequency of the reference clock signal. A removed, or 'stolen' cycle for this particular configuration is produced by control unit 410 of FIG. 5 setting each of the EN[3:0] to logic zero, which will subsequently result in each of the Clk_EN_0°, Clk_EN_90°, Clk_EN_180°, and Clk_EN_270° falling low. After stealing a clock cycle the previous pattern may repeat itself.

In some embodiments, it may be desirable to maintain the duty cycle of the domain clock at 50% even when removing cycles using the technique described above. This may be accomplished by control unit 410 setting one or more of the enable signals to a logic one (outside of the normal pattern) in order to stretch a cycle, which may effectively remove a cycle.

Thus, using multiple instances of the apparatus including a clock divider, a control unit, and the cycle stealing unit, along with embodiments of the method described herein, multiple domain clock signals can be produced using a single PLL. The frequency of each of the domain clock signals may be changed as necessary according to the needs of the processor. For example, the frequency of one or more of the domain clock signals may be reduced in a low power state, or increased during a heavier workload.

While the present invention has been described with reference to particular embodiments, it will be understood that the embodiments are illustrative and that the invention scope is not so limited. Any variations, modifications, additions, and improvements to the embodiments described are possible. These variations, modifications, additions, and improvements may fall within the scope of the inventions as detailed within the following claims.

What is claimed is:

1. A method for producing a plurality of clock signals, the method comprising:
   generating a reference clock signal using a phase-locked loop (PLL);
   providing the reference clock signal to each of a plurality of clock divider units;
   dividing the reference clock signal in each of the clock divider units in order to produce a corresponding plurality of divided clock signals;
   removing one or more clock cycles from each of the divided clock signals in order to produce a plurality of domain clock signals each having an effective frequency based on a frequency of and a number of cycles removed from its correspondingly received divided clock signal.

2. The method as recited in claim 1 further comprising the PLL outputting the reference clock signal in multiple phases.

3. The method as recited in claim 2, wherein the reference clock signal is output in phases of 0°, 90°, 180°, and 270°.

4. The method as recited in claim 3 further comprising:
   providing the each of the divided clock signals in each of the multiple phases to a corresponding one of a plurality of cycle stealing units;
   removing one or more cycles from each of the multiple phases of the divided clock signals in each of the plurality of cycle stealing units; and synthesizing each of the domain clock signals using each of the one or more cycles removed.

5. The method as recited in claim 4 further comprising selecting which of the one or more cycles are removed from each of the multiple phases of the divided clock signals using a plurality of control signals.

6. The method as recited in claim 1 further comprising a plurality of cycle stealing units each receiving a corresponding divided clock signal and a control signal, wherein each of the plurality of cycle stealing units includes a latch coupled to receive the corresponding divided clock signal, wherein the latch is configured to allow the corresponding divided clock signal to pass when the control signal is asserted.

7. The method as recited in claim 6, wherein each of the plurality of cycle stealing units includes an AND gate coupled to receive the corresponding divided clock signal and an output from the latch.

8. The method as recited in claim 1, wherein each of the domain clock signals has a 50% duty cycle.

9. An apparatus for producing a plurality of clock signals, the apparatus comprising:
 a phase-locked loop (PLL), wherein the PLL is configured to generate a reference clock signal;
 a plurality of clock divider units each coupled to receive the reference clock signal from the PLL, wherein each of the plurality of clock divider units is configured to generate one of a plurality of divided clock signals from the reference clock signal; and
 a plurality of cycle stealing units, wherein each of the cycle stealing units is coupled to receive a one of the plurality of divided clock signals from a corresponding one of plurality of clock divider units, wherein each of the plurality of clock divider units is configured to remove one or more cycles from the one of the plurality of divided clock signals in order to generate a corresponding one of a plurality of domain clock signals each having an effective frequency based on a frequency of and a number of cycles removed from its corresponding divided clock signal.

10. The apparatus as recited in claim 9, wherein the PLL is configured to output the reference clock signal in multiple phases.

11. The apparatus as recited in claim 10, wherein the PLL is configured to output the reference clock signal in phases of 0°, 90°, 180°, and 270°.

12. The apparatus as recited in claim 11, wherein each of the cycle stealing units is coupled to receive the corresponding one of the plurality of divided clock signals in each of the multiple phases and is configured to remove one or more cycles from each of the multiple phases of the corresponding divided clock signal, and wherein the apparatus further includes a plurality of clock synthesizers each coupled to a corresponding one of the plurality of cycle stealing units, wherein each of the clock synthesizers is configured to synthesize a corresponding one of the plurality of domain clock signals using each of the one or more cycles removed from each of the multiple phases of the corresponding divided clock signal.

13. The apparatus as recited in claim 12, wherein each of the cycle stealing units is coupled to receive a plurality of control signals, and wherein each of the cycle stealing units is configured to select which of the one or more cycles are removed from each of the multiple phases of their correspondingly received divided clock signals based on the plurality of control signals.

14. The apparatus as recited in claim 9, wherein each of the plurality of cycle stealing units includes a latch coupled to receive the corresponding one of the plurality of divided clock signals, wherein the latch coupled to receive a control signal, and wherein the latch is configured to allow the divided clock signal to pass when the control signal is asserted.

15. The apparatus as recited in claim 14, wherein each of the plurality of cycle stealing units includes an AND gate coupled to receive the corresponding one of the plurality of divided clock signals and an output from the latch.

16. The apparatus as recited in claim 9, wherein each of the domain clock signals has a 50% duty cycle.

17. An processor comprising:
 a phase-locked loop (PLL), wherein the PLL is configured to generate a reference clock signal; and
 a plurality of clock domains, wherein the plurality of clock domains includes at least a first processor core and a second processor core, and wherein each of the plurality of clock domains includes:
  a clock divider unit coupled to receive the reference clock signal from the PLL, wherein the clock divider unit is configured to generate a divided clock signal from the reference clock signal; and
  a cycle stealing unit, the cycle stealing unit is coupled to receive the divided clock signal clock divider unit, wherein the clock divider unit is configured to remove one or more cycles from the divided clock signal in order to generate a domain clock signal having an effective frequency based on a frequency of and a number of cycles removed from the divided clock signal.

18. The processor as recited in claim 17, further comprising a plurality of clock synthesizers each coupled to a corresponding one of the plurality of cycle stealing units, wherein each of the plurality of clock synthesizers is configured to generate the corresponding output signal using the cycles removed from the corresponding divided clock signal.

\* \* \* \* \*